(12) United States Patent
Lu et al.

(10) Patent No.: US 11,748,906 B2
(45) Date of Patent: Sep. 5, 2023

(54) GAZE POINT CALCULATION METHOD, APPARATUS AND DEVICE

(71) Applicant: BEIHANG UNIVERSITY, Beijing (CN)

(72) Inventors: Feng Lu, Beijing (CN); Mingfei Jiang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 228 days.

(21) Appl. No.: 17/107,817

(22) Filed: Nov. 30, 2020

(65) Prior Publication Data

US 2021/0374994 A1 Dec. 2, 2021

(30) Foreign Application Priority Data

May 26, 2020 (CN) .......................... 202010456584.9

(51) Int. Cl.
*G06F 3/01* (2006.01)
*G06T 17/00* (2006.01)
*G06V 40/16* (2022.01)
*G06T 7/70* (2017.01)
*G06T 7/73* (2017.01)
(Continued)

(52) U.S. Cl.
CPC ................ *G06T 7/75* (2017.01); *G06F 3/013* (2013.01); *G06T 7/50* (2017.01); *G06T 17/00* (2013.01); *G06V 40/161* (2022.01); *H04N 23/698* (2023.01); *G06T 2207/30201* (2013.01)

(58) Field of Classification Search
CPC . G01S 5/16; G06F 3/012; G06F 3/013; G06T 17/00; G06T 2207/20084; G06T 2207/30201; G06T 7/50; G06T 7/73; G06T 7/75; G06V 40/161; G06V 40/18; H04N 5/23238
See application file for complete search history.

(56) References Cited

U.S. PATENT DOCUMENTS 10,027,888 B1 * 7/2018 Mackraz ................ G06V 20/47
2016/0307372 A1 * 10/2016 Pitts ..................... H04N 23/957
(Continued)

FOREIGN PATENT DOCUMENTS

CN 103019507 A 4/2013
CN 109711239 A 5/2019
(Continued)

OTHER PUBLICATIONS

Xia, machine translation of CN109886246. (Year: 2019).*
(Continued)

*Primary Examiner* — Sing-Wai Wu
(74) *Attorney, Agent, or Firm* — J.C. Patents

(57) ABSTRACT

The embodiments of the present disclosure provide a gaze point calculation method, apparatus and device. The method includes: determining a 3D model of a first scene; obtaining a first panoramic image captured in the first scene, the first panoramic image includes a face image of a face; determining a spatial location of the face according to the first panoramic image; determining a gaze direction corresponding to the face according to the first panoramic image; and determining an eye gaze target according to the 3D model, the spatial location and the gaze direction. The accuracy of tracking the eye gaze in 3D model is improved.

10 Claims, 8 Drawing Sheets

(51) Int. Cl.
*G06T 7/50* (2017.01)
*H04N 23/698* (2023.01)

(56) References Cited

U.S. PATENT DOCUMENTS

2018/0184073 A1\* 6/2018 Burgess ................ B64C 39/024
2019/0089897 A1\* 3/2019 Bezares Sánchez ........................
                                                                                                 H04N 13/239

FOREIGN PATENT DOCUMENTS

| CN | 109886246 A | 6/2019 |
| CN | 110099219 A | 8/2019 |
| CN | 110251070 A | 9/2019 |
| CN | 110458122 A | 11/2019 |
| CN | 110619303 A | 12/2019 |
| WO | WO2019176037 A1 | 3/2018 |

OTHER PUBLICATIONS

The first OA of CN application No. 2020104565849.
Notice of Allowance of priority CN application No. 202010456584.9.

\* cited by examiner

GAZE POINT CALCULATION METHOD, APPARATUS AND DEVICE

CROSS-REFERENCE TO RELATED APPLICATION

This application claims priority to Chinese Patent Application No. 202010456584.9, filed on May 26, 2020, which is hereby incorporated by reference in its entirety.

TECHNICAL FIELD

This disclosure relates to the field of computer technology and, in particular, to a gaze point calculation method, apparatus and device.

BACKGROUND

With the rapid development of computer vision and human-machine interaction technology in recent years, the eye tracking technology is of great significance for user behavior analysis and efficient human-machine interaction. For example, the user unlocks mobile phones and computers and performs other operations by controlling the moving track of the sight.

In the prior art, the eye tracking technology usually uses an infrared light source and a camera to locate the sight. For example, infrared rays are reflected from the surface of the eyeball to the camera, which will change the imaging of the eyeball, the pupil of the eye will become white, and the reflection point of the infrared ray on the surface of the eyeball will also become white. However, this technology usually requires the use of multiple infrared devices and cameras, increasing the equipment costs, and in the 3D model, it is impossible to accurately track the eye gaze, resulting in low accuracy in tracking the eye gaze direction.

SUMMARY

The embodiments of the present disclosure provide a gaze point calculation method, apparatus and device. The accuracy of tracking the eye gaze in 3D model is improved.

In the first aspect, an embodiment of the present disclosure provides a gaze point calculation method, including:

determining a 3D model of a first scene;

obtaining a first panoramic image captured in the first scene, the first panoramic image includes an image of a human face;

determining a spatial location of the face according to the first panoramic image;

determining a gaze direction corresponding to the face according to the first panoramic image; and determining an eye gaze target according to the 3D model, the spatial location and the gaze direction.

In a possible implementation, the determining the spatial location of the face includes:

determining angular coordinates of the face relative to a first photographing device, the first photographing device is a device that captures the first panoramic image;

determining a radial distance of the face relative to the first photographing device;
and determining the spatial location according to the angular coordinates and the radial distance.

In a possible implementation, the determining the angular coordinates of the face relative to the first photographing device includes:

determining face detection areas in the first panoramic image;

obtaining a first perspective image corresponding to each face detection area;

performing a face detection on the first perspective images, to determine a first coordinate of a face image in each first perspective image, the first coordinate is a coordinate of the face image in a corresponding first perspective image; and determining angular coordinates of a face corresponding to a face image in each first perspective image relative the first photographing device according to the first coordinate of the face image in the each first perspective image.

In a possible implementation, the determining the eye gaze target according to the 3D model, the spatial location and the gaze direction includes:

determining an eye gaze area in the 3D model according to the 3D model, the spatial location and the gaze direction; and determining the eye gaze target according to the eye gaze area.

In a possible implementation, the determining the eye gaze area in the 3D model according to the 3D model, the spatial location and the gaze direction includes:

determining an eye gaze model according to the gaze direction and the spatial location; and determining an eye gaze area in the 3D model according to the 3D model and the eye gaze model.

In a possible implementation, the determining the eye gaze target according to the eye gaze area includes:

determining distribution densities corresponding to each sub-area of the eye gaze area, the distribution densities are used to indicate distribution densities of the gaze points in the eye gaze area; and determining the eye gaze target according to the distribution densities and objects included in the 3D model.

In a possible implementation, the determining a gaze direction corresponding to the face according to the first panoramic image includes:

determining a first direction of the face in a camera coordinate system, where the camera coordinate system is a coordinate system with the photographing device as a coordinate origin, and the second photographing device is a device that captures the first perspective image; and determining a gaze direction according to the first direction, where the gaze direction is a direction in a world coordinate system.

In a possible implementation, the determining the 3D model of the first scene includes:

determining areas for reconstructing a scene in a second scene image;

obtaining a second perspective image corresponding to each area for reconstructing the scene;

performing a single-image 3D reconstruction on the second perspective images, to obtain depth maps of the second perspective images;

determining the 3D model according to the depth maps of the second perspective images.

In a second aspect, an embodiment of the present disclosure provides a gaze point calculation apparatus, including a first determining module, an obtaining module, a second determining module, a third determining module and fourth determining module:

the first determining module is configured to determine a 3D model of a first scene;

the obtaining module is configured to obtain a first panoramic image captured in the first scene, the first panoramic image includes a face image of a face;

the second determining module is configured to determine a spatial location of the face according to the first panoramic image;

the third determining module is configured to determine a gaze direction corresponding to the face according to the first panoramic image; and the fourth determining module is configured to determine an eye gaze target according to the 3D model, the spatial location and the gaze direction.

In a third aspect, an embodiment of the present disclosure provides a terminal device, including: a processor, the processor is coupled with a memory;

the memory is configured to store a computer program; and the processor is configured to execute the computer program stored in the memory, so that the terminal device executes the gaze point calculation method according to any one of the above first aspect.

In a fourth aspect, an embodiment of the present disclosure provides a readable storage medium, including a program or an instruction, when the program or instruction is run on a computer, the gaze point calculation method according to any one of the above first aspect is executed.

In the present disclosure, after obtaining the first panoramic image from the database, the gaze point calculation apparatus may process the first panoramic image, for example, obtain the face image in the first panoramic image, determine the spatial location of the face, and determine the gaze direction corresponding to the face. The gaze point calculation apparatus can determine the eye gaze target in the first panoramic image in combination with the 3D model of the first scene in the database. In the above process, according to the first panoramic image input by the user, the eye gaze target in the obtained first panoramic image is determined and the 3D model of the first scene is combined, therefore the eye gaze target in any orientation in the first panoramic image can be accurately obtained, and the accuracy of tracking the eye gaze in 3D model is improved.

DESCRIPTION OF EMBODIMENTS

Exemplary embodiments will be described in detail here, and examples thereof are shown in the accompanying drawings. When the following description relates to the accompanying drawings, unless otherwise indicated, the same numbers in different drawings represent the same or similar elements. The embodiments described in the following exemplary embodiments do not represent all embodiments consistent with the present disclosure. On the contrary, they are only examples of devices and methods consistent with some aspects of the present disclosure as detailed in the appended claims.

The terms "comprising/including" and "having" and any variations thereof in the specification and claims and the drawings of the present disclosure are intended to cover non-exclusive inclusions. For example, a process, method, system, product, or device that includes a series of steps or units is not limited to the listed steps or units, but optionally includes steps or units that are not listed, or optionally also includes other steps or units inherent to these processes, methods, products, or device.

In order to facilitate understanding, firstly, the architecture applicable to the present disclosure will be described in conjunction with FIG. 1.

Figure 1:
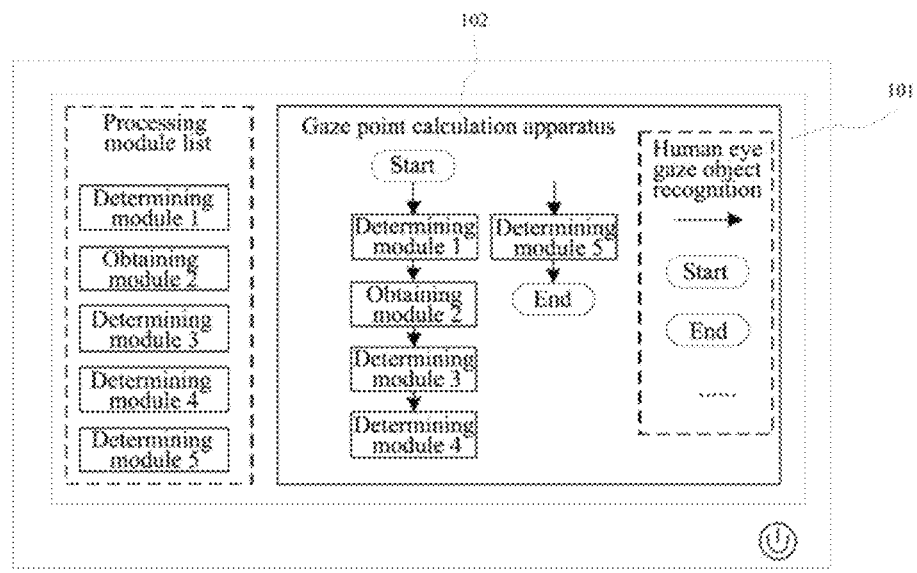
FIG. 1 is a structural diagram of a gaze point calculation method provided by an embodiment of the present disclosure.

FIG. 1 is a structural diagram of a gaze point calculation method provided by an embodiment of the present disclosure. Please refer to FIG. 1, the terminal device 101 is included. The terminal device 101 includes a gaze point calculation apparatus 102, where the gaze point calculation apparatus 102 includes a processing module list. For example, the processing module list may include a determining module 1, an obtaining module 2, a determining module 3, a determining module 4 and a determining module 5. The gaze point calculation apparatus 102 may process the first panoramic image input by the user and, in combination with the 3D model of the first scene, determine the eye gaze target in the first panoramic image.

In the present disclosure, the gaze point calculation apparatus 102 may process the first panoramic image, for example, obtain the face image in the first panoramic image, determine the spatial location of the face, and determine the gaze direction corresponding to the face. The gaze point calculation apparatus 102 can determine the eye gaze target in the first panoramic image in combination with the 3D model of the first scene. In the above process, according to the first panoramic image input by the user, the eye gaze position in the first panoramic image is determined and the 3D model of the first scene is combined, therefore the eye gaze target in any orientation in the first panoramic image can be accurately obtained, and the accuracy of tracking the eye gaze in 3D model is improved.

Figure 2A:
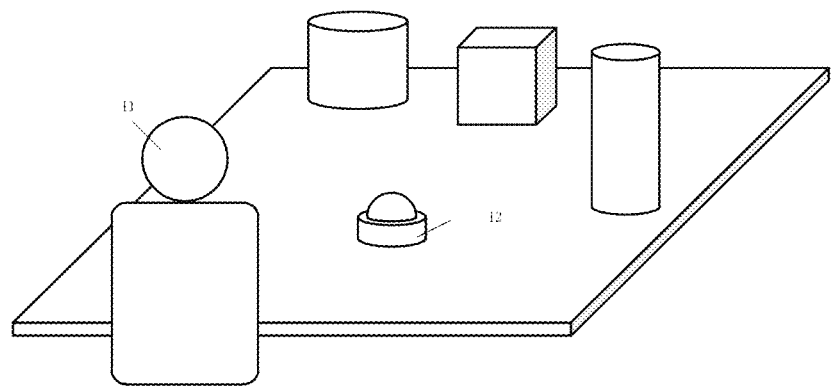
FIG. 2A is a schematic diagram of an application scene provided by an embodiment of the present disclosure.
Figure 2B:
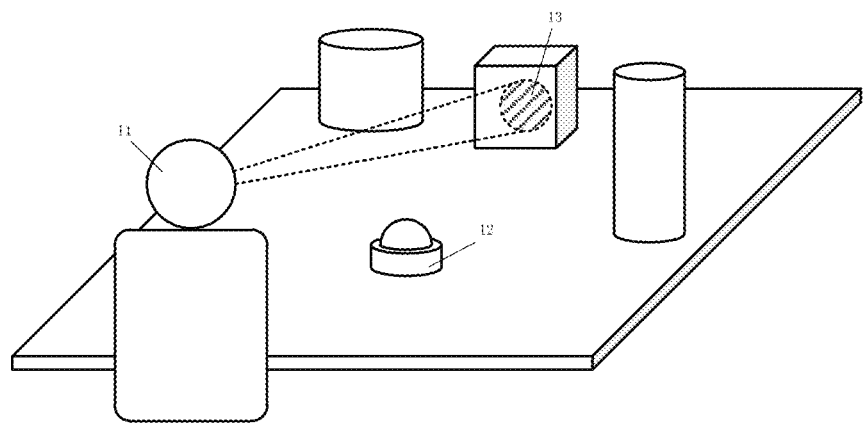
FIG. 2B is a schematic diagram of another application scene provided by an embodiment of the present disclosure.

For ease of understanding, the following describes the application scene applicable to the embodiments of the present disclosure in conjunction with FIG. 2A-2B.

FIG. 2A is a schematic diagram of an application scene provided by an embodiment of the present disclosure, and FIG. 2B is a schematic diagram of another application scene provided by an embodiment of the present disclosure. Please refer to FIG. 2A, in this scene, a first photographing device 12, a face 11 and a cube are included, the first photographing device 12 is located in the center of the scene, the first photographing device 12 is a device that captures a first panoramic image, for example, the first photographing device 12 may include a fish-eye camera with a horizontal field of view of 210 degrees and a vertical field of view of 210 degrees. The panoramic image in the current scene can be captured with a fish-eye camera. As shown in FIG. 2B, the first photographing device 12 is located in the center of the scene, the panoramic image captured by the first photographing device 12 is processed according to the gaze point calculation method shown in FIG. 1, the spatial location of the face 11 and the gaze direction of the eye can be determined, and then in combination with 3D model, the eye gaze target 13 in the scene can be determined.

Hereinafter, the solution shown in this disclosure will be described in detail through specific embodiments. It should be noted that the following embodiments can exist independently or can be combined with each other, and the same or similar content will not be repeated in different embodiments.

Figure 3:
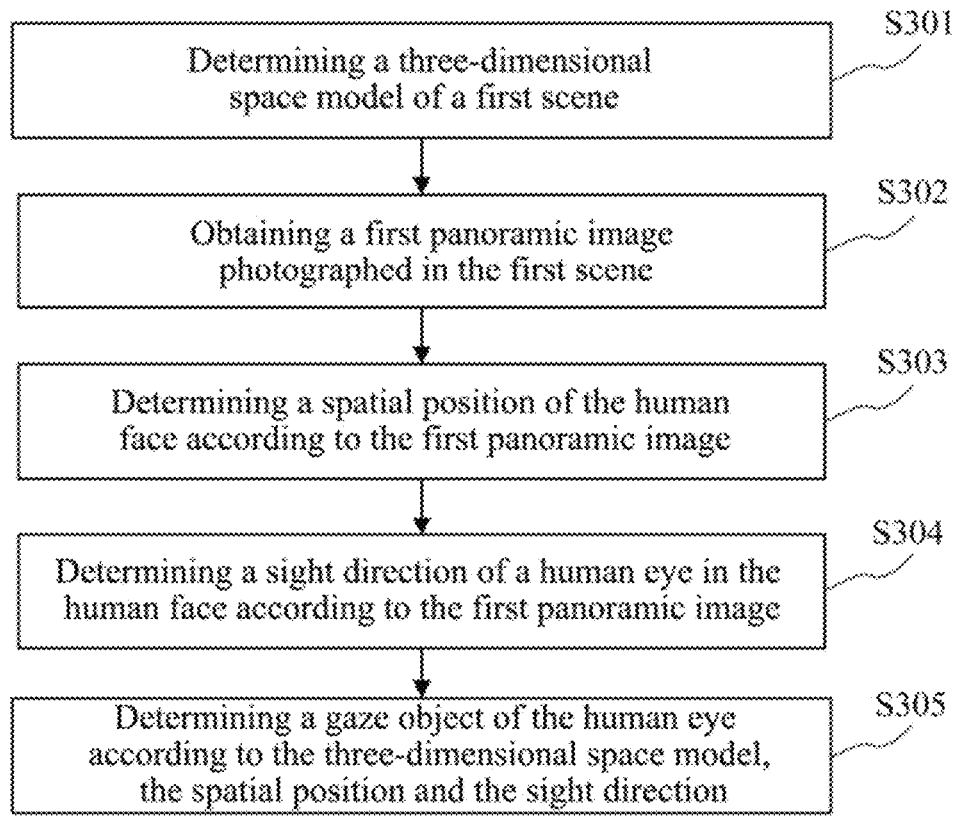
FIG. 3 is a schematic flowchart of a gaze point calculation method provided by an embodiment of the present disclosure.

FIG. 3 is a schematic flowchart of a gaze point calculation method provided by an embodiment of the present disclosure. Please refer to FIG. 3, the method may include:

S301, obtaining a 3D model of a first scene.

The execution entity of the embodiments of the present disclosure may be an electronic device, or may be a data processing apparatus provided in the electronic device. The electronic device can be a computer, a server, etc. The electronic device may be a portable electronic device. For example, the electronic device may be a mobile phone, a tablet computer, etc. The data processing device can be realized by software, or by a combination of software and hardware.

The 3D model may be a virtual representation of the actual three-dimensional space. For example, in the medical industry, 3D models can be used to make accurate models of organs, and in the architectural field, 3D models can be used to show the structure of buildings. The 3D model can be composed of point clouds, which are a massive collection of points that represent the spatial distribution and surface characteristics of the target in the same spatial coordinate system. For example, a point cloud can be obtained according to the spatial coordinate of each sampling point on the surface of the object to form a 3D model of the object. The 3D model can be composed of a mesh, which is a point cloud with a topological structure. For example, the point cloud can be input into a mesh generation algorithm to generate a mesh. The topological structure indicates the point-to-point connections in the point cloud. The 3D model can be depth maps, and the depth map can refer to an image in which pixel values are the distances from the image collector to respective points in the scene, which directly reflects the geometric shape of the visible surface of the scene.

The 3D model is usually displayed by a computer or other video equipment. For example, the 3D model displayed by the computer can be a real-world entity or a fictitious object. In a possible implementation, the 3D model of the first scene may be obtained according to a mathematical model of a plane or a curved surface. For example, a mathematical model of four planes can be used to construct a 3D model of a tetrahedron. In a possible implementation, the 3D model of the first scene may be obtained according to the position and size of the object in the first scene. For example, according to the position and space size of the table, stool, or plate in the first scene, the 3D model of the first scene is composed of spatial geometric models such as prisms, spheres, or truncated cones with approximate dimensions at the same position. In a possible implementation, the 3D model of the first scene may be obtained from a stored database. For example, in the field of architecture, the 3D model of the building structure is usually stored in a database, and the building structure can be visually observed, and the 3D model of the known first scene can be directly obtained from the database. In a possible implementation, the 3D model of the first scene can be directly obtained according to a deep learning-based single-image 3D reconstruction algorithm.

S302, obtaining a first panoramic image captured in the first scene.

The first panoramic image can be a picture containing the information of the first scene obtained through a photographing device in the first scene. The software is used to combine the pictures and play them with a specific player. The plane picture can be converted into a 360-degree view, and the two-dimensional plane picture can be simulated into a real three-dimensional space. The first scene information may include entities in the first scene. For example, the first scene information may include the position of table, stool, or plate.

In a possible implementation, the first panoramic image can be directly captured according to a special wide-angle lens, for example, a fish-eye lens.

Figure 4:
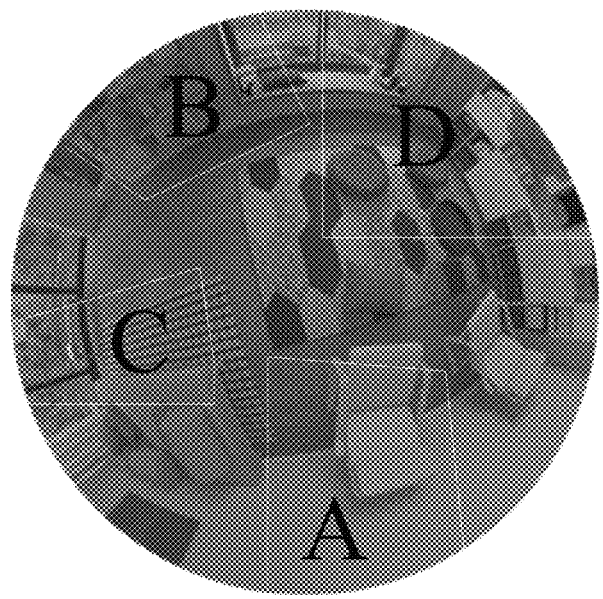
FIG. 4 is a schematic diagram of a panoramic image provided by an embodiment of the present disclosure.

FIG. 4 is a schematic diagram of a panoramic image provided by an embodiment of the present disclosure. Please refer to FIG. 4, the first photographing device uses a special wide-angle lens to obtain the panoramic image shown in FIG. 4, which includes four areas A, B, C, and D. For example, the first photographing device may use a fish-eye lens with a horizontal field of view of 210 degrees and a vertical field of view of 210 degrees to obtain a panoramic image.

The first panoramic image may include a face image of a face. The first panoramic image of the first scene can be obtained through the first photographing device. For example, the first panoramic image of the first scene can be captured by a mobile phone, a single-lens reflex camera or other equipment.

In a possible implementation, when the first panoramic image of the first scene is captured, the first photographing device can select a wide-angle lens with any angle of view, or can do the selection according to the three-dimensional structure model of the first scene. For example, the first photographing device is taken as the center, the horizontal field of view may be 210 degrees, and the vertical field of view may be 210 degrees, and the first panoramic image of the first scene can be obtained. The first panoramic image of the first scene can also be obtained by using multiple first photographing devices to photograph in different directions at the same time and stitching the captured pictures. In a possible implementation, the first panoramic image may include face images of multiple people, for example, an area in the first panoramic image includes face images of three people. In a possible implementation, the first panoramic image in the first scene may also be obtained from a database. For example, in the field of transportation, multiple panoramic images of the first scene at the time of the accident can be obtained from the database of the transportation system to track the driver's sight, thereby determining the cause of the accident.

S303, determining a spatial location of the face according to the first panoramic image.

The spatial location of the face refers to the spatial location of the face relative to the first photographing device. For example, the position of the face may be 1 meter on the upper left relative to the photographing device, and the first photographing device may be used as an origin of a spherical coordinate system to describe the spatial location of the face.

The spatial location can be determined in the following way: the angular coordinates (azimuthal angle and polar angle) and the radial distance.

The angular coordinate refers to the azimuthal angle and the polar angle of the face relative to the first photographing device in a spherical coordinate system. The first photographing device may be a device that captures the first panoramic image, and may include a fish-eye camera, a single-lens reflex camera, and the like. In a possible implementation, the first photographing device may be used as the center of a spherical coordinate system, and the angular coordinate may be expressed in the spherical coordinate system. For example, the azimuthal angle of the face relative to the first photographing device may be 30 degrees, and the polar angle of the face may be 45 degrees, then the coordinate of the face in the spherical coordinate system may include ($r_{face}$, 30,45), where $r_{face}$ refers to the distance between the face and the first photographing device.

The radial distance refers to the distance between the face and the first photographing device, where the first photographing device may be a device that captures the first panoramic image, and may include a fish-eye camera, a single-lens reflex camera, and the like. In a possible implementation, the first photographing device may be used as the center of a spherical coordinate system, and the radial distance may be expressed in the spherical coordinate system. For example, the distance between the face and the first photographing device may be 1 meter, and the coordinate of the face in the spherical coordinate system can be expressed as (1,$\theta_{face}$,$\varphi_{face}$), the $\theta_{face}$,$\varphi_{face}$ refers to the angular coordinates of the face relative to the first photographing device.

According to the angular coordinates of the face in the spherical coordinate system and the distance between the face and the first photographing device in the spherical coordinate system, the spatial location ($r_{face}$,$\theta_{face}$,$\varphi_{face}$) of the face in the spherical coordinate system with the first photographing device as the coordinate origin can be determined, where the $r_{face}$ may be the distance between the face and the first photographing device in the spherical coordinate system with the first photographing device as the coordinate origin, the $\theta_{face}$,$\varphi_{face}$ may be the angular coordinates of the face relative to the first photographing device in a spherical coordinate system with the first photographing device as the coordinate origin.

The angular coordinates of the face corresponding to the face image relative to the first photographing device may be determined in the following manner: it is determined according to the first coordinate of the face image in each of the first perspective images.

The first perspective images may be the first perspective images corresponding to the face detection areas in the first panoramic image. The face detection area may be a sampling area where a face image exists in the first panoramic image. In a possible implementation, multiple face detection areas may be set in the first panoramic image, and the acquired position coordinate of the face detection areas may be recorded at the same time. For example, the first panoramic image may be an image captured through a fish-eye lens with a horizontal field of view of 210 degrees and a vertical field of view of 210 degrees, the first panoramic image may include 10 face detection areas, and the position coordinate of one of the face detection areas may be may be coordinate in a spherical coordinate system with the first photographing device as the coordinate origin.

The first perspective images corresponding to the face detection areas refer to the images of the face detection areas that reflect the perspective phenomenon. The perspective phenomenon is a phenomenon where a scene is large in the vicinity and is small in the distance, for example, an object close to us looks large, while the object far away from us looks small.

Figure 5A:
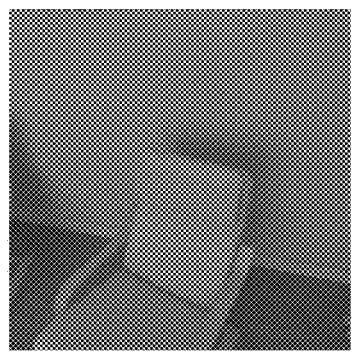
FIG. 5A is a perspective image corresponding to area A in the panoramic image of FIG. 4.
Figure 5B:
FIG. 5B is a perspective image corresponding to area B in the panoramic image of FIG. 4.
Figure 5C:
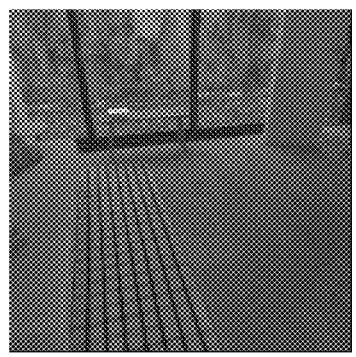
FIG. 5C is a perspective image corresponding to area C in the panoramic image of FIG. 4.
Figure 5D:
FIG. 5D is a perspective image corresponding to area D in the panoramic image of FIG. 4.

Hereinafter, the perspective image will be described with reference to FIGS. 5A-5D. FIG. 5A is a perspective image corresponding to area A in the panoramic image of FIG. 4, FIG. 5B is a perspective image corresponding to area B in the panoramic image of FIG. 4, FIG. 5C is a perspective image corresponding to area C in the panoramic image of FIG. 4, and FIG. 5D is a perspective image corresponding to area D in the panoramic image of FIG. 4.

Since the face detection areas can be an area obtained from the first panoramic image, the images of the face detection areas have a distortion phenomenon, so the images of the face detection areas need to be rectified to obtain the first perspective images corresponding to the face detection areas.

The first perspective images corresponding to the face detection areas can be determined as following: it is determined according to the method of pixel remapping.

The method of pixel remapping is mapping each pixel in the image to the corresponding position in another image according to a certain rule to generate a new image. In a possible implementation, the first perspective images corresponding to the face detection areas can be obtained from the images of the face detection areas according to the rule of the pixel coordinate mapping matrix. The size of the pixel coordinate mapping matrix is the same as that of the target image, and each of elements in the matrix records the pixel coordinate of the corresponding position in the first panoramic image.

The pixel coordinate mapping matrix can be determined according to the following way: adjusting the input parameters of the rectification algorithm.

The rectification parameter may include the height and width of the first perspective image, the vertical and horizontal field of view of the virtual perspective camera, and the offset angle of the first perspective image. The height and width of the first perspective image may indicate the size of the first perspective image. For example, the height of the first perspective image may be 500 pixels, and the width of the first perspective image may be 300 pixels. The virtual perspective camera may be a virtual camera to which a horizontal field of view and a vertical field of view have been set. For example, the virtual perspective camera may be a virtual camera with a horizontal field of view of 60 degrees and a vertical field of view of 60 degrees. The offset angle of the first perspective image may be the angular coordinates of the center point of the first perspective image.

If the center point of the first perspective image is at (1,0,0) and the plane of the first perspective image is perpendicular to the x-axis, the initial three-dimensional rectangular coordinates (X,Y,Z) of the elements in the pixel coordinate mapping matrix can be calculated according to the following formula:

$$\begin{cases} X_{ij} = 1 \\ Y_{ij} = \left(1 - \frac{2 \times j}{w}\right) \times \tan\frac{wFOV}{2} \\ Z_{ij} = \left(1 - \frac{2 \times i}{h}\right) \times \tan\frac{hFOV}{2} \end{cases}$$

where i and j are the row and column index values of an element in the pixel coordinate mapping matrix; $X_{ij}$ is the X coordinate in the initial three-dimensional rectangular coordinates of the element; $Y_{ij}$ is the Y coordinate in the initial three-dimensional rectangular coordinates of the element; $Z_{ij}$ is the Z coordinate in the initial three-dimensional rectangular coordinates of the element; h is the height of the first perspective image; w is the width of the first perspective image; hFOV is the vertical field of view of the virtual perspective camera; and wFOV is the horizontal field of view of the virtual perspective camera.

The three-dimensional rectangular coordinates $(X'_{ij}, Y'_{ij}, Z'_{ij})$ having been transformed by the elements in the pixel coordinate matrix can be obtained according to the coordinate transformation matrices, which can be calculated according to the following formula:

$$\begin{bmatrix} X'_{ij} \\ Y'_{ij} \\ Z'_{ij} \end{bmatrix} = R_z R_y \begin{bmatrix} X_{ij} \\ Y_{ij} \\ Z_{ij} \end{bmatrix}$$

where i and j represent the row and column index values of the element in the matrix respectively; $R_z$ represents the rotation matrix for a rotation around the z-axis; $R_y$ represents the rotation matrix for a rotation around the y-axis; $X_{ij}, Y_{ij}, Z_{ij}$ are the initial three-dimensional rectangular coordinates of the elements in the pixel coordinate mapping matrix; and $X'_{ij}, Y'_{ij}, Z'_{ij}$ are the three-dimensional rectangular coordinates having been transformed by the elements in the pixel coordinate matrix.

$R_y$ and $R_z$ can be determined according to the following formula:

$$\begin{cases} R_z = \begin{bmatrix} \cos\theta_{perspective} & -\sin\theta_{perspective} & 0 \\ \sin\theta_{perspective} & \cos\theta_{perspective} & 0 \\ 0 & 0 & 1 \end{bmatrix} \\ R_y = \begin{bmatrix} \sin\varphi_{perspective} & 0 & -\cos\varphi_{perspective} \\ 0 & 1 & 0 \\ \cos\varphi_{perspective} & 0 & \sin\varphi_{perspective} \end{bmatrix} \end{cases}$$

where $\theta_{perspective}, \varphi_{perspective}$ are the offset angles; $R_z$ represents the rotation matrix for a rotation around the z-axis; and $R_y$ represents the rotation matrix for a rotation around the y-axis.

The angular coordinates $(\theta_{ij}, \varphi_{ij})$ of a pixel in the face detection area corresponding to an element of the pixel coordinate mapping matrix can be obtained according to the three-dimensional rectangular coordinate $(X'_{ij}, Y'_{ij}, Z'_{ij})$ obtained by rotating the elements in the pixel coordinate mapping matrix. $\theta_{ij}$ and $\varphi_{ij}$ can be determined according to the following formula:

$$\begin{cases} \theta_{ij} = \arctan\frac{Y'_{ij}}{X'_{ij}} \\ \varphi_{ij} = \arccos\frac{Z'_{ij}}{\sqrt{X'^2_{ij} + Y'^2_{ij} + Z'^2_{ij}}} \end{cases}$$

where i and j represent the row and column index values of the element in the matrix respectively; $X'_{ij}, Y'_{ij}, Z'_{ij}$ are the three-dimensional rectangular coordinate obtained by rotating the elements in the pixel coordinate matrix; and $\theta_{ij}$ and $\varphi_{ij}$ are the angular coordinates of a pixel in the face detection area corresponding to an element of the pixel coordinate mapping matrix.

The pixel coordinate of a pixel in the face detection that area corresponding to an element can be obtained according to the angular coordinates of a pixel in the face detection area corresponding to an element of the pixel coordinate mapping matrix, and the first perspective images corresponding to the face detection areas can be obtained after pixel remapping.

A second photographing device may be used to obtain the first perspective images corresponding to the face detection areas, where the second photographing device may be a device that captures the first perspective image, and the second photographing device may be a virtual device. For example, the second photographing device is a virtual camera, the parameters in the pixel coordinate mapping matrix may be changed to determine the photographing range of the virtual camera, and the first perspective images corresponding to the face detection areas captured by the virtual camera may be obtained according to the method of pixel remapping. In a possible implementation, a perspective camera with a fixed field of view which is placed in the position of the first photographing device for photographing may be used as the second photographing device. Multiple perspective images can be obtained according to the polar and azimuthal angles of the perspective camera, and the multiple perspective images may be determined as the first perspective images corresponding to the face detection areas.

Figure 6A:
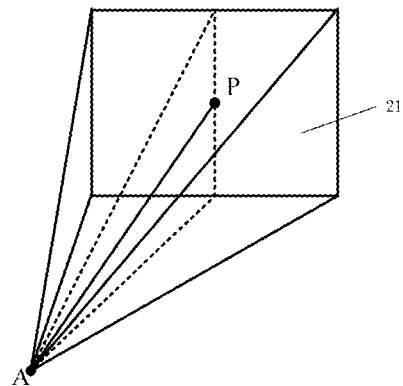
FIG. 6A is a schematic diagram of a vertical field of view of a second photographing device provided by an embodiment of the present disclosure.
Figure 6B:
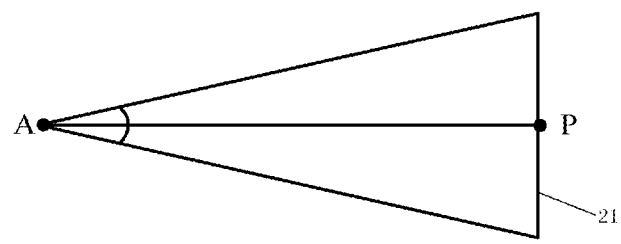
FIG. 6B is a schematic diagram of a side view of a vertical field of view of a second photographing device provided by an embodiment of the present disclosure.

The process of obtaining the first perspective image 21 corresponding to the face detection area according to the second photographing device in the present disclosure will be described below in conjunction with FIGS. 6A-6B. FIG.

6A is a schematic diagram of a vertical field of view of a second photographing device provided by an embodiment of the present disclosure. Please refer to FIG. 6A, A is the second photographing device, P is a center point of the first perspective image 21 corresponding to the face detection area, and the vertical field of view of the second photographing device that obtains the first perspective image 21 corresponding to the face detection area is shown in FIG. 6A. FIG. 6B is a schematic diagram of a side view of a vertical field of view of a second photographing device provided by an embodiment of the present disclosure. Please refer to FIG. 6B, A is the second photographing device, P is a point of the first perspective image 21 corresponding to the face detection area, and the vertical field of view of the second photographing device that obtains the first perspective image 21 corresponding to the face detection area is shown in FIG. 6B.

Figure 7:
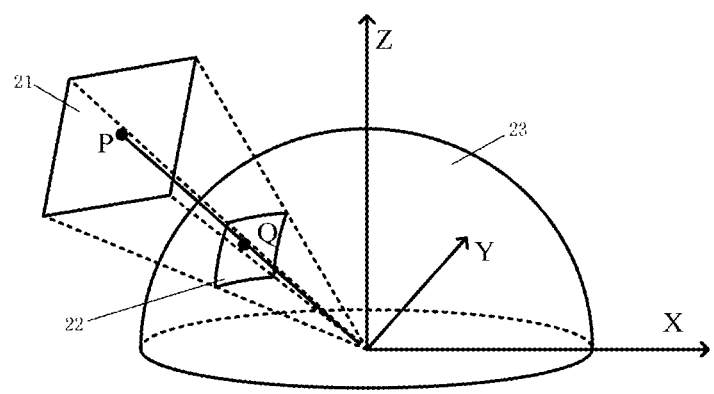
FIG. 7 is a schematic diagram of a perspective projection model provided by an embodiment of the present disclosure.

FIG. 7 is a schematic diagram of a perspective projection model provided by an embodiment of the present disclosure. Please refer to FIG. 7, the coordinate system is a spherical coordinate system established by taking the first photographing device as the coordinate origin. The first photographing device is a device that captures the first panoramic image, where the first photographing device uses a fish-eye lens with a horizontal field of view of 180 degrees and a vertical field of view of 180 degrees as a wide-angle lens, the photographing range 23 may be a hemisphere as shown in FIG. 6, the first panoramic image captured by the first photographing device may be all the images in the photographing range 23. The point Q is a point in the face detection area 22, and the point P is a point, which corresponds to the point Q, on the first perspective image 21 corresponding to the face detection area. At this time, the second photographing device is a virtual device, and the rectification parameter, for example, the height and width of the first perspective image, the offset angle of the first perspective image, the vertical field of view and the horizontal field of view of the second photographing device, are selected according to the face detection area 22. The first perspective image 21 corresponding to the face detection area is obtained according to the method of pixel remapping. For example, as shown in FIG. 7, the height and width of the first perspective image, the offset angle of the first perspective image, the vertical field of view and the horizontal field of view of the second photographing device are selected according to the face detection area 22, so that the face detection area 22 is within the photographing range 23 of the second photographing device. The first perspective image 21 corresponding to the face detection area captured by the second photographing device can be obtained according to the method of pixel remapping.

In a possible implementation, the first perspective image 21 corresponding to the face detection area can be obtained according to the method of pixel remapping. For example, a virtual camera is used instead of the second photographing device, no matter how many degrees the field of view of the virtual camera is set, the first perspective images can be obtained according to the method of calculating the pixel coordinate mapping matrix. In this way, without replacing the second photographing device, multiple first perspective images with different angles and different ranges can be obtained, which saves the cost of the photographing device.

Figure 8:
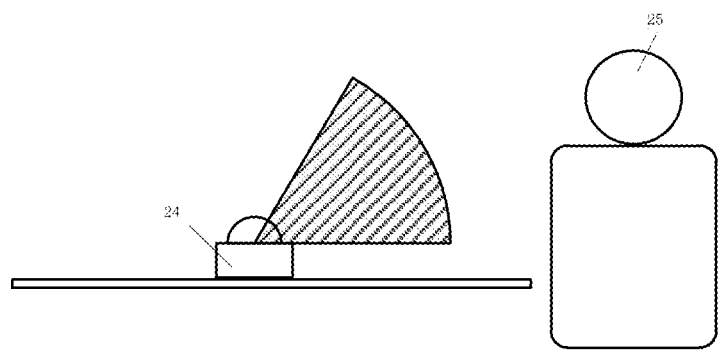
FIG. 8 is a schematic diagram of a face detection scene provided by an embodiment of the present disclosure.

FIG. 8 is a schematic diagram of a face detection scene provided by an embodiment of the present disclosure. Please refer to FIG. 8, a second photographing device 24 and a face 25 are included, where the second photographing device 24 can photograph an image in a set field of view, and the second photographing device can photograph an image according to the set azimuthal and polar angles, for example, the shaded area in FIG. 8 is the photographing range of the second photographing device. In a possible implementation, the first perspective images captured by the second photographing device 24 may be used as the first perspective images corresponding to the face detection areas. For example, if it is required to obtain 12 first perspective images corresponding to the face detection areas from the first panoramic image, considering the position of the face 25 relative to the fish-eye camera, the direction parameters of the i-th perspective image of the second photographing device can be set to $\varphi_{perspective}=60°$, $\theta_{perspective}=30°×i$, and the field of view is set to 60 degrees. Based on the above steps, 12 first perspective images corresponding to the detection area of the face 25 can be obtained in the first panoramic image and there are overlapping parts among the 12 first perspective images, thereby reducing the missed detection rate of the face detection.

The first perspective images corresponding to the face detection areas are input into the face detection algorithm, and then the first coordinate of the face image in each first perspective image can be obtained. The first coordinate of the face image refers to the coordinate of the face image in the corresponding first perspective image. For example, the first perspective images corresponding to the face detection areas are input into the face detection algorithm, and if a face is detected, the image rectangular coordinates, that is, the first coordinate of the face in the first perspective images are recorded. In a possible implementation, the YOLO algorithm can be used as the face detection algorithm in the embodiment of the present disclosure, or the algorithm provided in the Dlib computer vision library can be used.

The angular coordinates of the face corresponding to the face image in each first perspective image relative to the first photographing device is determined according to the first coordinate of the face image in each first perspective image.

In a possible implementation, the $\theta$ and $\varphi$ coordinates of the spherical coordinate of the face in the three-dimensional space can be determined according to the first coordinate of the face image, the position coordinate of the face detection areas, and the conversion relationship between the three-dimensional rectangular coordinate and the spherical coordinate. For example, if the first coordinate of the face image and the position coordinate of the face detection are given, the first coordinate of the face image in the rectangular coordinate system can be converted into the spherical coordinate according to the conversion relationship between rectangular coordinate and spherical coordinate.

The radial distance of the face relative to the photographing device can be determined in the following manner: according to the position of the feature points of the face.

The face feature points may be points that reflect the characteristics of the face image, and can identify the face in the face image. The first perspective images of the face detection areas may be rectified according to the input parameters of the rectification algorithm, so that the face is at the center of the rectified first perspective image. For example, by adjusting the offset angles $\theta_{perspective}$ and $\varphi_{perspective}$, the first perspective images corresponding to the rectified face detection areas with the face as the center can be obtained. In a possible implementation, a face feature point detection algorithm can be used to extract the positions of the face feature points from the first perspective images corresponding to the rectified face detection areas, and the positions of the face feature points implicit the head pose. The position coordinates of the face feature points are the coordinates of the face feature points in the image coordinate system of the first perspective images corresponding to the rectified face detection areas, and the head pose is used to indicate the action posture of the head, for example, the head pose in the position of the face feature point may include the lowering head, the raising head, and so on.

In a possible implementation, the face feature point detection algorithm may include the algorithm provided in the Dlib computer vision library.

In the case of assuming the actual size of the user's head, the distance $r_{face}$ between the face and the first photographing device can be obtained by calculation according to the positions of the face feature points and the input parameters of the rectification algorithm. For example, if the head size is ignored, according to the offset angle of the first perspective image in the rectification parameter and the coordinates of the face feature points in the image coordinate system of the first perspective image corresponding to the rectified face detection area, the distance between the face and the first photographing device can be calculated through geometric principles.

The spatial location $(r_{face}, \theta_{face}, \varphi_{face})$ of the face can be determined according to the angular coordinates $\theta_{face}, \varphi_{face}$ and the radial distance $r_{face}$.

S304, determining a gaze direction corresponding to the face according to the first panoramic image.

The gaze direction corresponding to the face is the direction in the world coordinate system. The world coordinate system can be the absolute coordinate system of the system. Before the user coordinate system is established, the coordinates of all points on the screen are determined by the coordinate origin of the world coordinate system.

The gaze direction of the eye in the world coordinate system can be determined in the following way: according to the first direction and the coordinate transformation matrix of the face in the camera coordinate system.

Figure 9:
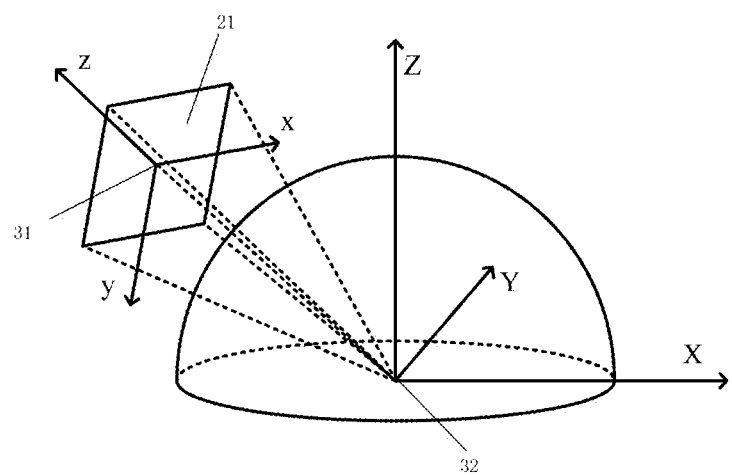
FIG. 9 is a schematic diagram of the world coordinate system and the camera coordinate system provided by an embodiment of the present disclosure.

FIG. 9 is a schematic diagram of the world coordinate system and the camera coordinate system provided by an embodiment of the present disclosure. Please refer to FIG. 9, the world coordinate system 32 is a three-dimensional rectangular coordinate system established by taking the first photographing device as the coordinate origin, where the first photographing device may include a fish-eye camera, and the photographing range may be a hemispherical range as shown in FIG. 9. The camera coordinate system 31 is a coordinate system with the second photographing device as the coordinate origin, and may take the optical center of the photographing device as the coordinate origin. The x-axis of the camera coordinate system 31 is parallel to the x-axis of the image coordinate system of the first perspective image 21 corresponding to the face detection area, and the y-axis of that is parallel to the y-axis of the image coordinate system of the first perspective image corresponding to the face detection area, and the z-axis of that is the optical axis of the second photographing device and is perpendicular to the plane of the first perspective image 21 corresponding to the face detection area. The three-dimensional rectangular coordinate system formed by these is called the camera coordinate system 31, and the camera coordinate system 31 is a three-dimensional coordinate system. The second photographing device may include a single-lens reflex camera and a virtual perspective camera.

The first direction of the face in the camera coordinate system can be determined by an eye gaze estimation algorithm. In a possible implementation, the first perspective images corresponding to the rectified face detection areas can be input to the eye gaze estimation algorithm, and the eye gaze estimation algorithm can output the first direction of the gaze direction of the eye in the perspective images of the rectified face detection areas based on the camera coordinate system. In a possible implementation, the eye gaze estimation algorithm may include an deep learning-based eye gaze estimation algorithm. In a possible implementation, samples in the MPIIGaze data set can be used as training samples for a deep learning model of the eye gaze estimation algorithm.

In a possible implementation, the first direction of the gaze direction of the eye in the camera coordinate system may be determined according to the positions of the face feature points and the pupil detection algorithm. For example, the eye image can be obtained according to the coordinates of the face feature points in the pixel coordinate system of the first perspective image corresponding to the rectified face detection area, and the eye image is input into the pupil detection algorithm, and the pupil detection algorithm outputs the gaze direction of the eye based on the positions of the pupils of both eyes.

The first direction vector $(x_{gaze}, y_{gaze}, z_{gaze})$ of the gaze direction of the eye in the camera coordinate system can be calculated according to the gaze direction of the eye and the head pose.

The coordinate transformation matrix can transform the first direction of the gaze direction of the eye in the camera coordinate system to the direction in the world coordinate system. For example, the first direction $(X_{gaze}, Y_{gaze}, Z_{gaze})$ of the gaze direction of the eye in the camera coordinate system is transformed into three-dimensional rectangular coordinate $(X_{gaze}, Y_{gaze}, Z_{gaze})$ in the world coordinate system with the first photographing device as the coordinate origin according to the rectification parameters for rectifying the first perspective image corresponding to the face detection area, where the $X_{gaze}, Y_{gaze}, Z_{gaze}$ correspond to the first direction $(X_{gaze}, Y_{gaze}, Z_{gaze})$ in the camera coordinate system. Specifically, the rotation matrix for a rotation around each coordinate axis can be determined according to the following formula:

$$\begin{cases} R_z = \begin{bmatrix} \sin\theta & \cos\theta & 0 \\ -\cos\theta & \sin\theta & 0 \\ 0 & 0 & 1 \end{bmatrix} \\ R_x = \begin{bmatrix} 1 & 0 & 0 \\ 0 & \cos\varphi & \sin\varphi \\ 0 & -\sin\varphi & \cos\varphi \end{bmatrix} \end{cases}$$

where $R_z$ represents the rotation matrix for a rotation around the z-axis; $R_x$ represents the rotation matrix for a rotation around the x-axis; and $\theta$ and $\varphi$ represent the offset angle of the first perspective image when rectifying the first perspective image corresponding to the face detection area.

On this basis, the gaze direction $(X_{gaze}, Y_{gaze}, Z_{gaze})$ of the eye in the world coordinate system is determined according to the following formula:

$$\begin{bmatrix} X_{gaze} \\ Y_{gaze} \\ Z_{gaze} \end{bmatrix} = R_z R_x \begin{bmatrix} x_{gaze} \\ y_{gaze} \\ z_{gaze} \end{bmatrix}$$

where $X_{gaze}, Y_{gaze}, Z_{gaze}$ is the first direction of the gaze direction of the eye in the camera coordinate system; $X_{gaze}$, $Y_{gaze}, Z_{gaze}$ is the gaze direction of the eye in the world coordinate system; $R_z$ represents the rotation matrix for a rotation around the z-axis; $R_x$ represents the rotation matrix for a rotation around the x-axis.

S305, determining an eye gaze target according to the 3D model, the spatial location and the gaze direction.

The eye gaze target may be an object included in the eye gaze 3D model. For example, the 3D model includes people and table, stool, sofa, etc., and the eye gaze target can be table and stool in the 3D model.

In a possible implementation, the eye gaze target may be determined according to the following manner: according to the distribution densities and the objects included in the 3D model. For example, if the 3D model includes table and stool, and the distribution densities on the table are the highest, it can be determined that the eye is looking at the table.

The distribution densities are used to indicate the distribution densities of gaze points in the eye gaze area. For example, if the eye gaze area includes a table and a stool, and the distribution densities of the gaze points on the table are greater than the distribution densities of the gaze points on the stool, it can be determined that the gaze points of the eye is mainly the table.

The eye gaze area may be the eye gaze area in the 3D model, which may be determined according to the 3D model and the eye gaze model. The eye gaze model can be a model obtained by modeling the eye gaze in the form of a straight line in space. For example, the eye gaze can be modeled in the form of a straight line in space according to the calculated eye gaze direction in the world coordinate system. The eye gaze model can be determined according to the gaze direction and the spatial location.

In a possible implementation, the three-dimensional rectangular coordinate $(X_{face}, Y_{face}, Z_{face})$ of the face can be obtained from the spherical coordinate $(r_{face}, \theta_{face}, \varphi_{face})$ of the face according to the conversion relationship between the spherical coordinate and the three-dimensional rectangular coordinate, and then the parametric equations of the line of the eye gaze can be obtained:

$$\begin{cases} X = X_{face} + X_{gaze}t \\ Y = Y_{face} + Y_{gaze}t (t > 0) \\ Z = Z_{face} + Z_{gaze}t \end{cases}$$

where X, Y, Z are the coordinate on the coordinate axis of the three-dimensional rectangular coordinate system, $X_{gaze}$, $Y_{gaze}$, $Z_{gaze}$ are the direction of the eye gaze in the world coordinate system, $X_{face}$, $Y_{face}$, $Z_{face}$ are the three-dimensional rectangular coordinate of the face, and t is the parameter.

In a possible implementation, filter conditions can be set to set the eye gaze area. For example, a point in the space is taken and a circle is made with the distance from the point to the line of sight as the radius, the area within the circle can be the eye gaze area.

In a possible implementation, the range of the eye gaze area can be set according to the visual angle of the eye. For example, the horizontal field of view of the eye can be 180 degrees, and the eye gaze area can be determined according to the horizontal field of view of the eye.

The distribution densities are determined according to the following formula:

$$f(d) = \begin{cases} 1 - \dfrac{d}{d_{max}}, & d < d_{max} \\ 0, & d \geq d_{max} \end{cases}$$

where d represents the normal distance between the element in the three-dimensional structure of the current scene and the sight; and $d_{max}$ is the set filter threshold.

In order to select the elements in the 3D model of the environment that meet the $d_{max}$ condition, the parameter t corresponding to the projection position of the element on the line of sight can be used.

In a possible implementation, the normal distance d between the element and the sight, and the parameter t corresponding to the projection position of the element on the line of sight are determined according to the following formula:

$$\begin{cases} d = \dfrac{\|(X - X_{face}) \times X_{gaze}\|}{\|X_{gaze}\|} \\ t = \dfrac{(X - X_{face}) \cdot X_{gaze}}{\|X_{gaze}\|} \end{cases}$$

where X represents the three-dimensional coordinate of the element in the current scene; $X_{face}$ represents the three-dimensional rectangular coordinate of the spatial location of the face; $X_{gaze}$ represents the gaze direction of the eye in the world coordinate system; d represents the normal distance between the element and the sight; and t represents the parameter corresponding to the projection position of the element on the sight.

In this disclosure, after the gaze point calculation apparatus obtains the first panoramic image from the database, the gaze point calculation apparatus may process the first panoramic image, for example, obtain the face image in the first panoramic image, determine the spatial location of the face, and determine the gaze direction corresponding to the face. The gaze point calculation apparatus combines the 3D model of the first scene in the database to determine the eye gaze target in the first panoramic image. In the above process, the eye gaze target in the first panoramic image is determined according to the first panoramic image input by the user, and the 3D model of the first scene is combined, therefore the eye gaze target in any orientation in the first panoramic image can be accurately obtained, and the accuracy of tracking the eye gaze in the 3D model is improved.

On the basis of the embodiment in FIG. 3, the method for calculating the gaze point will be described in detail below in conjunction with FIG. 10.

Figure 10:
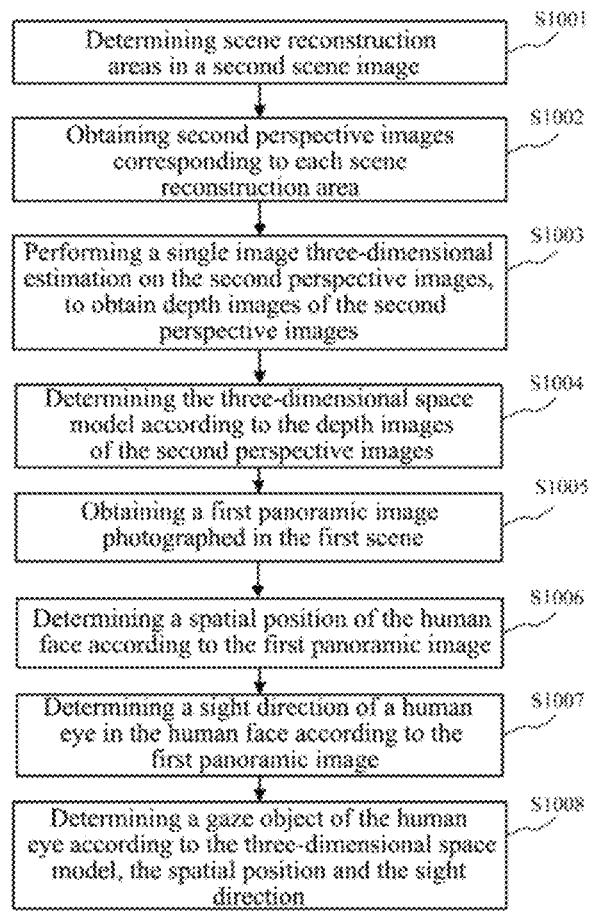
FIG. 10 is a schematic flowchart of another gaze point calculation method provided by an embodiment of the present disclosure.

FIG. 10 is a schematic flowchart of another gaze point calculation method provided by an embodiment of the present disclosure. Please refer to FIG. 10, the method may include:

S1001, determining areas for reconstructing a scene in a second scene image.

The second scene image refers to a panoramic image in the first scene, and is used to obtain scene information in the first scene. The scene information in the first scene may include entities in the first scene. For example, the first scene information may include the positions of a table, a stool or a plate in the first scene. The second scene image in the first scene may include a spherical panoramic image, a cylindrical panoramic image, a cubic panoramic image, and a group of multi-directional images shot by multiple cameras.

In a possible implementation, multiple second scene pictures may be acquired through the first photographing device. For example, a fish-eye lens with a horizontal field of view of 210 degrees and a vertical field of view of 210 degrees can be used as a wide-angle lens of the photographing device to acquire multiple second scene images in the first scene.

The area for reconstructing the scene may be an area where a 3D model needs to be constructed. For example, in the second scene image, the areas for reconstructing the scene can be determined to construct a 3D model of a part of the scene.

In a possible implementation, multiple areas for reconstructing the scene can be set in the second scene image.

S1002, obtaining second perspective images corresponding to each area for reconstructing the scene.

The perspective image can be a graph that reflects a perspective phenomenon. The perspective phenomenon is a phenomenon where the scene is large in the vicinity and is small in the distance, for example, an object close to us looks large, while the object far away from us looks small. The second perspective images corresponding to the areas for reconstructing the scene can be determined according to the method of pixel remapping in step S301.

S1003, performing a single-image 3D reconstruction on the second perspective images, to obtain depth maps of the second perspective images.

The depth map can refer to images whose pixel values is the distance from the image collector to each point in the scene, which directly reflects the geometric shape of the visible surface of the scene. For example, if a certain pixel value in the depth map is 50 (in millimeters), it means that the distance from the object closest to the camera plane to the plane is 50 millimeters.

The image 3D reconstruction can determine the depth map of the image. For example, a deep learning-based single-image 3D reconstruction algorithm can be used to obtain the depth map of the second perspective image. In a possible implementation, samples in the NYU-Depth data set can be used as training samples for the single-image 3D reconstruction algorithm for deep learning model training. In a possible implementation, a stereo matching method may be used to obtain the depth map of the second scene image.

In the below, with reference to FIGS. 11-14, the process of obtaining the depth map of the second scene image using the stereo matching method will be described in detail, please refer to FIG. 11.

Figure 11:
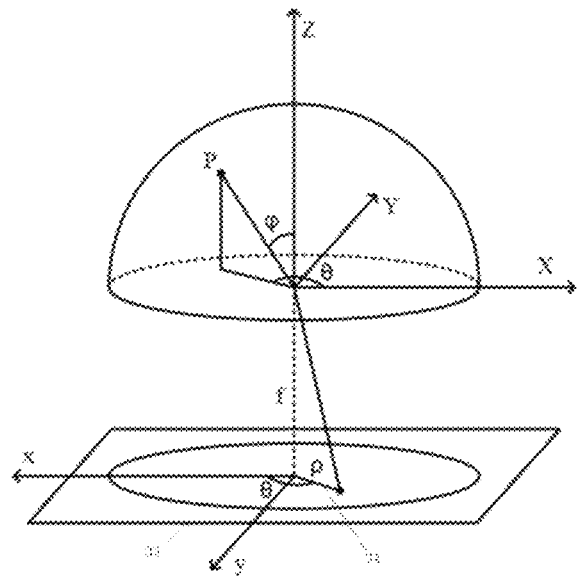
FIG. 11 is a schematic diagram of the imaging principle of a fish-eye camera provided by an embodiment of the present disclosure.

FIG. 11 is a schematic diagram of the imaging principle of a fish-eye camera provided by an embodiment of the present disclosure, and the fish-eye camera uses an equidistant projection model to obtain a second scene image. Please refer to FIG. 11, the spherical coordinate system is a spherical coordinate system established by taking the fish-eye camera as the coordinate origin, where the rectangular coordinate system 33 is the rectangular coordinate system 33 of the second scene image, the coordinate system 34 in epipolar geometry is the coordinate system 34 in epipolar geometry of the second scene image, and the hemisphere is the photographing range of the fish-eye camera. As shown in FIG. 11, the spherical coordinate of point P in the spherical coordinate system are $(r,\theta,\varphi)$, where r is the distance between point P and the coordinate origin, $\theta$ is the angle between the projection line of the connection from the point P to the origin point on the XOY plane and the positive x-axis, and $\varphi$ is the angle between the connection line from the point P to the origin point and the positive z-axis. The relationship between the point P and the coordinate $(\rho, \theta)$ in the coordinate system 34 in epipolar geometry of the projection point on the corresponding second scene image:

$$\rho = f\varphi$$

where f is the focal length of the fish-eye camera, $\varphi$ is the angle between the connection line from the point P to the origin point and the positive z-axis, $\rho$ is the radial distance of the point P, $\theta$ is the azimuthal angle of P, and the spherical coordinate 0 of the point P in the three-dimensional space is the same as the coordinate 0 in the coordinate system 34 in epipolar geometry of the projection point P on the corresponding second scene image. Therefore, the coordinate conversion relationships can be established between the three-dimensional rectangular coordinate system of the point P, the spherical coordinate system, the coordinate of the rectangular coordinate system 33 of the second scene image of the projection point P and the coordinate of the coordinate system 34 in epipolar geometry of the second scene image of the projection point P in the three-dimensional space. For example, the $\theta$ of the coordinate system in epipolar geometry and the $\theta$ of the spherical coordinate system are the same, and the coordinate in epipolar geometry can be converted into spherical coordinate according to $\rho = f\varphi$.

Figure 12:
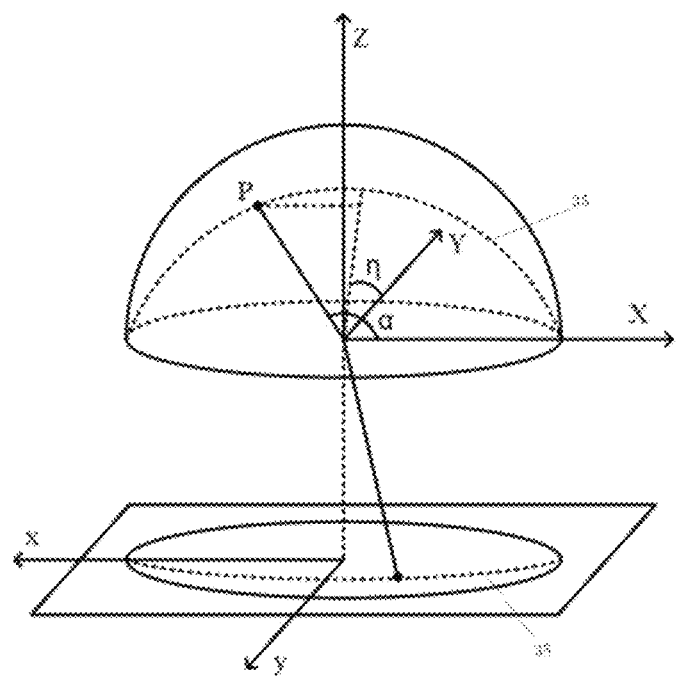
FIG. 12 is a schematic diagram of epipolar lines of a second scene image provided by an embodiment of the present disclosure.

FIG. 12 is a schematic diagram of epipolar lines of a second scene image provided by an embodiment of the present disclosure. Please refer to FIG. 12, the spherical coordinate system is a spherical coordinate system established by taking the fisheye camera as the coordinate origin. As shown in FIG. 12, point P is a point in the spherical coordinate system, a is the angle between the projection line of the connection from the point P to the origin point on the XOY plane and the positive x-axis; η is the angle between the connection line from the point P to the origin point and the positive y-axis, the hemisphere is the photographing range of the fish-eye camera, the projection of the photographing range on the plane projection surface is a circle, and the rectangular coordinate system is the rectangular coordinate system on the projection surface.

In a possible implementation, a longitude and latitude mapping method may be used to rectify the epipolar lines 35 in the second scene image to a straight line, for example, η is equivalent to longitude and a is equivalent to latitude, and the epipolar lines 35 in the second scene image is rectified.

In a possible implementation, the second scene image can be cropped to retain the part of the vertical field of view within 180 degrees. The coordinate system in epipolar geometry is established as shown in FIG. 12, and the conversion relationship from the spherical coordinate $(r,\theta,\varphi)$ of the projection point P in the second image to the coordinate in epipolar geometry $(\alpha,\eta)$ can be determined.

Figure 13:
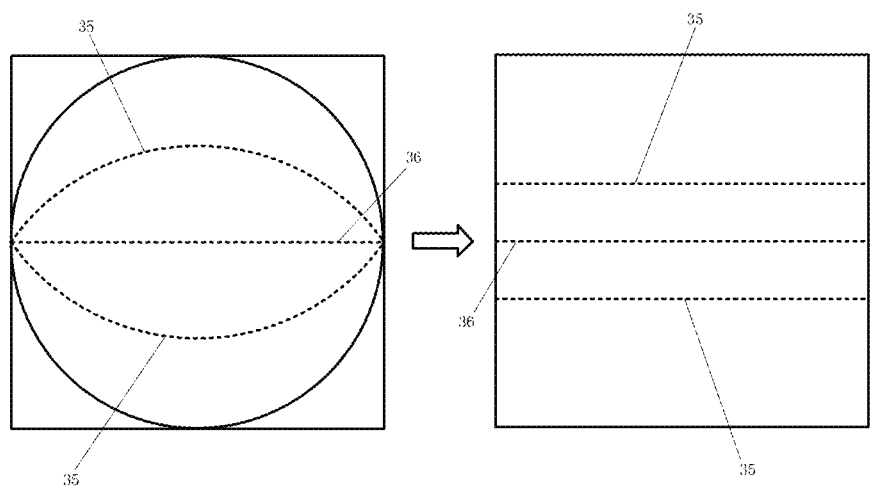
FIG. 13 is a schematic diagram of rectified epipolar lines of a second scene image provided by an embodiment of the present disclosure.

FIG. 13 is a schematic diagram of rectified epipolar lines of second scene images provided by an embodiment of the present disclosure. Please refer to FIG. 13, the fish-eye camera is used to move in any direction in the horizontal plane, and two second scene images—$I_1$ and $I_2$ are respectively taken at the starting point and the ending point of the movement. At this time, it is necessary to perform the rectification of the processing of the epipolar lines on $I_1$ and $I_2$. The second scene images $I_1$ and $I_2$ before the rectification of the epipolar lines have two curved epipolar lines, and the second scene images $I_1$ and $I_2$ after the rectification of the epipolar lines have parallel epipolar lines.

The image rectangular coordinates of all pixels in the second scene images $I_1$ and $I_2$ after the rectification of the epipolar lines 35 is calculated according to the coordinate conversion relationship in FIG. 12. The second scene images $I_1'$ and $I_2'$ after the rectification of the epipolar lines 35 of $I_1$ and $I_2$ are obtained by using the method of pixel remapping. After the rectification of the epipolar lines 35, the second scene images and $I_2'$ have the polar lines 35 parallel to the polar axis 36, any point P in the three-dimensional space has the same $\eta$ coordinate in the second scene images $I_1'$ and $I_2'$, and the image rectangular coordinate (x,y) and the coordinate ($\alpha$, $\eta$) in epipolar geometry of all pixels in the second scene images $I_1'$ and $I_2'$ have a linear relationship.

The pixels in the second scene images $I_1'$ and $I_2'$ can be densely matched according to the SGBM stereo matching method, to calculate the disparity map $I_{\Delta x}$. Each pixel value in the disparity map $I_{\Delta x}$ represents the difference $\Delta x$ of the x coordinate in the image rectangular coordinate (x,y) of each pair of matching pixels in $I_1'$ and $I_2'$. By using the above linear relationship between the rectangular coordinate (x, y) and the coordinate ($\alpha$, $\eta$) in epipolar geometry, the linear transformation of all pixel values $\Delta x$ in the disparity map $I_{\Delta x}$ can be used to obtain the disparity map $I_{\Delta \alpha}$ of the second scene images. Each pixel value in the disparity map $I_{\Delta \alpha}$ of the second scene images represents the difference $\Delta \alpha$ of the $\alpha$ coordinate in the coordinate ($\alpha,\eta$) in epipolar geometry of each pair of matched pixels in $I_1'$ and $I_2'$.

Figure 14:
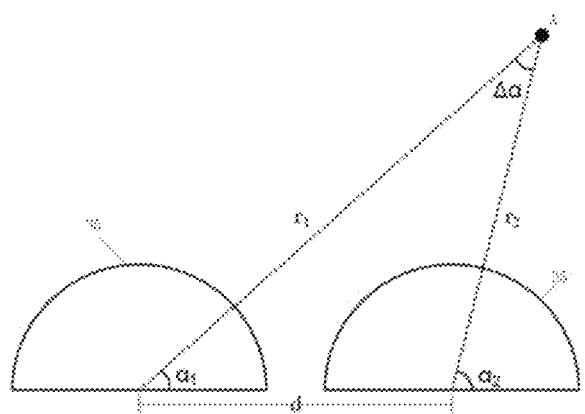
FIG. 14 is a schematic diagram of a process of calculating a disparity map provided by an embodiment of the present disclosure.

FIG. 14 is a schematic diagram of a process of calculating a disparity map provided by an embodiment of the present disclosure. Please refer to FIG. 14, taking the plane where any one of the epipolar lines 35 is located as the cross section, the point A is the same spatial point captured by the fish-eye camera at the two photographing positions. $r_1$ and $r_2$ are the distance between point A in the 3D model corresponding to the pixel and the photographing device, A$\alpha$ is the difference of a in coordinate in epipolar geometry, $\alpha_1$ is the angle between $r_1$ and the moving direction, and $\alpha_2$ is the angle between $r_2$ and the moving direction. When the moving distance d is determined, $r_1$ and $r_2$, that is, the true distance between the three-dimensional point corresponding to the pixel and the camera during the on-site initialization calculation process, can be calculated through simple geometric relations according to the coordinate ($\alpha,\eta$) in epipolar geometry of any pixel in the disparity map $I_{\Delta \alpha}$ of the second scene images and its pixel value M. According to the above method, the depth map $I_{Depth1}$ and $I_{Depth2}$ of the second scene images corresponding to the second scene images $I_1$ and $I_2$ can be calculated from the fish-eye disparity map $I_{\Delta \alpha}$.

S1004, determining the 3D model according to the depth maps of the second perspective images.

In a possible implementation, the 3D model can be determined according to the spatial location of the pixel.

The pixel value in the depth map of the second perspective image may be the radial distance r between the pixel and the photographing device. In step S1002, when acquiring the second perspective images of the areas for reconstructing the scene according to the method of the pixel remapping, the angular coordinates ($\theta,\varphi$) of the pixel in the areas for reconstructing the scene have been obtained in the process of calculating the pixel coordinate mapping matrix.

From this, the position ($r,\theta,\varphi$) of the pixel in space can be determined, the position (X, Y, Z) of the pixel in the three-dimensional rectangular coordinate system can be determined according to the coordinate conversion relationship between spherical coordinate and three-dimensional rectangular coordinate, thereby generating a point cloud, to form a 3D model.

S1005, obtaining a first panoramic image captured in the first scene.

It should be noted that, for the execution process of S1005, refer to the execution process of S302, which will not be repeated in this embodiment of the present disclosure.

S1006, determining a spatial location of the face according to the first panoramic image;

It should be noted that, for the execution process of S1006, refer to the execution process of S303, which will not be repeated in this embodiment of the present disclosure.

S1007, determining a gaze direction corresponding to the face according to the first panoramic image.

It should be noted that, for the execution process of S1007, refer to the execution process of S304, which will not be repeated in this embodiment of the present disclosure.

S1008, determining an eye gaze target according to the 3D model, the spatial location and the gaze direction. It should be noted that, for the execution process of S1008, refer to the execution process of S305, which will not be repeated in this embodiment of the present disclosure.

In the present disclosure, the gaze point calculation apparatus 102 may process the first panoramic image, for example, obtain the face image in the first panoramic image, determine the spatial location of the face, and determine the gaze direction corresponding to the face. The gaze point calculation apparatus 102 can determine the eye gaze target in the first panoramic image in combination with the 3D model of the first scene. In the above process, the establishment of the 3D model can be realized by only one photographing device, which reduces the cost of the device. At the same time, according to the first panoramic image input by the user, the gaze position of the eye in the first panoramic image is determined and the 3D model of the first scene is combined, therefore the eye gaze target in any orientation in the first panoramic image can be accurately obtained, and the accuracy of tracking the eye gaze in 3D model is improved.

Figure 15:
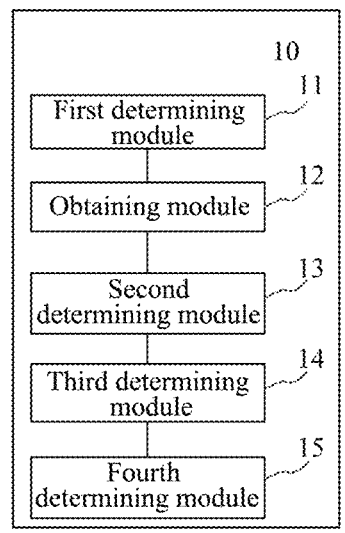
FIG. 15 is a schematic structural diagram of a gaze point calculation apparatus provided by an embodiment of the present disclosure.

FIG. 15 is a schematic structural diagram of a gaze point calculation apparatus provided by an embodiment of the present disclosure. The gaze point calculation apparatus 10 can be disposed in a terminal device. Please refer to FIG. 15, the gaze point calculation apparatus 10 includes a first determining module 11, an obtaining module 12, a second determining module 13, a third determining module 14 and a fourth determining module 15, where:

the first determining module 11 is configured to determine a 3D model of a first scene;

the obtaining module 12 is configured to obtain a first panoramic image captured in the first scene, the first panoramic image includes a face image of a face;

the second determining module 13 is configured to determine a spatial location of the face according to the first panoramic image;

the third determining module 14 is configured to determine a gaze direction corresponding to the face according to the first panoramic image; and the fourth determining module 15 is configured to determine an eye gaze target according to the 3D model, the spatial location and the gaze direction.

In a possible implementation, the second determining module 13 is specifically configured to:

determine angular coordinates of the face relative to a first photographing device, the first photographing device is a device that captures the first panoramic image;

determine a radial distance of the face relative to the first photographing device;

and determine the spatial location according to the angular coordinates and the radial distance.

In a possible implementation, the second determining module 13 is specifically configured to: determine face detection areas in the first panoramic image;

obtain first perspective images corresponding to each face detection area;

perform a face detection on the first perspective images, to determine a first coordinate of a face image in each first perspective image, the first coordinate is a coordinate of the face image in a corresponding first perspective image; and determine angular coordinates of a face corresponding to a face image in each first perspective image relative the first photographing device according to the first coordinate of the face image in the each first perspective image.

In a possible implementation, the fourth determining module 15 is specifically configured to:

determine an eye gaze area in the 3D model according to the 3D model, the spatial location and the gaze direction; and determine the eye gaze target according to the eye gaze area.

In a possible implementation, the fourth determining module 15 is specifically configured to:

determine an eye gaze model according to the gaze direction and the spatial location; and determine an eye gaze area in the 3D model according to the 3D model and the eye gaze model.

In a possible implementation, the fourth determining module 15 is specifically configured to:

determine distribution densities corresponding to each sub-area of the eye gaze area, the distribution densities are used to indicate distribution densities of the gaze points in the eye gaze area; and determine the eye gaze target according to the distribution densities and objects included in the 3D model.

In a possible implementation, the third determining module 14 is specifically configured to:

determine a first direction of the face in a camera coordinate system, the camera coordinate system is a coordinate system with the photographing device as a coordinate origin, and the second photographing device is a device that captures the first perspective image; and determine a gaze direction according to the first direction, and the gaze direction is a direction in a world coordinate system.

In a possible implementation, the first determining module 11 is specifically configured to:

determine areas for reconstructing a scene in a second scene image;

obtain a second perspective image corresponding to each area for reconstructing the scene;

perform a single-image 3D reconstruction on the second perspective images, to obtain depth maps of the second perspective images; and determine the 3D model according to the depth maps of the second perspective images.

An apparatus for calculating a gaze point provided in an embodiment of the present disclosure can execute the technical solutions shown in the foregoing method embodiments, the implementation principles and beneficial effects thereof are similar, and the details thereof are not described herein again.

Figure 16:
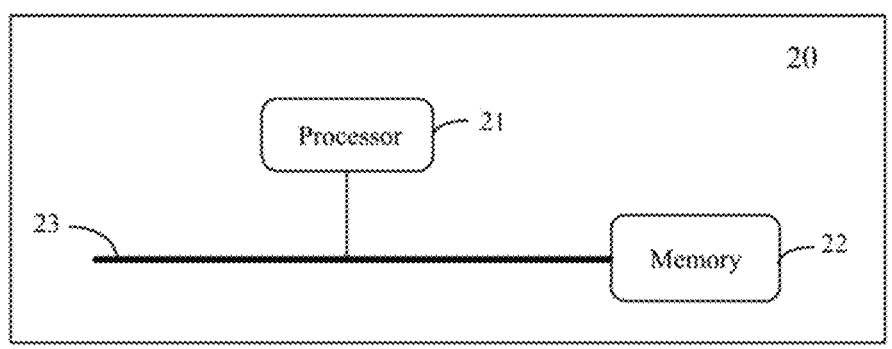
FIG. 16 is a schematic diagram of the hardware structure of a gaze point calculation apparatus provided by an embodiment of the present disclosure.

FIG. 16 is a schematic diagram of the hardware structure of a gaze point calculation apparatus provided by an embodiment of the present disclosure. As shown in FIG. 16, the gaze point calculation apparatus 20 includes: at least one processor 21 and a memory 22. The processor 21 and the memory 22 are connected by a bus 23.

In a possible implementation, the data processing apparatus 20 may further include a transmitter 24 and/or a receiver 25.

In a specific implementation process, at least one processor 21 executes the computer-executable instructions stored in the memory 22, so that at least one processor 21 executes the above gaze point calculation method.

The specific implementation process of the processor 21 can refer to the foregoing method embodiment, the implementation principles and beneficial effects thereof are similar, and the details thereof are not described herein again in the present embodiment.

In the embodiment shown in FIG. 14 above, it should be understood that the processor may be a central processing unit (English: Central Processing Unit, abbreviated as: CPU), or other general-purpose processors, a digital signal processors (English: Digital Signal Processor, abbreviated as: DSP), an application specific integrated circuits (English: Application Specific Integrated Circuit, abbreviated as: ASIC), etc. The general-purpose processor may be a microprocessor or the processor may also be any conventional processor or the like. The steps of the method disclosed in combination with the disclosure can be directly embodied as executed and completed by a hardware processor, or executed by a combination of hardware and software modules in the processor.

The memory may include high-speed RAM memory, and may also include non-volatile storage NVM, for example, at least one disk memory.

The bus may be an industry standard architecture (Industry Standard Architecture, ISA) bus, a peripheral device interconnection (Peripheral Component, PCI) bus, or an extended industry standard architecture (Extended Industry Standard Architecture, EISA) bus. The bus can be divided into address bus, data bus, control bus, etc. For ease of representation, the buses in the drawings of this disclosure are not limited to only one bus or one type of bus.

The present disclosure also provides a computer-readable storage medium, the computer-readable storage medium stores computer-executable instructions, and when the processor executes the computer-executable instructions, the above-mentioned gaze point calculation method is realized.

In the above-mentioned computer-readable storage medium, the above-mentioned readable storage medium may be implemented by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The readable storage medium may be any available medium that can be accessed by a general purpose or special purpose computer.

An exemplary readable storage medium is coupled to the processor, so that the processor can read information from the readable storage medium and can write information to the readable storage medium. The readable storage medium may also be an integral part of the processor. The processor and the readable storage medium may be located in Application Specific Integrated Circuits (Application Specific Integrated Circuits, abbreviated as: ASIC). Of course, the processor and the readable storage medium may also exist as discrete components in the device.

An embodiment of the present disclosure provides a computer program product. The computer program product includes instructions. When the instructions are executed, a computer is used to execute the above-mentioned gaze point calculation method.

The division of the units is only a logical function division, and there may be other divisions in actual implementation. For example, multiple units or components can be combined or integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the present disclosure essentially or the part that contributes to the existing technology or the part of the technical solution can be embodied in the form of a software product, and the computer software product is stored in a storage medium and includes a number of instructions to make a computer device (which may be a personal computer, a server, or a network device, etc.) execute all or part of the steps of the methods described in the various embodiments of the present disclosure. The aforementioned storage media include various media that can store program codes, such as a U disk, a mobile hard disk, a read-only memory (ROM, Read-Only Memory), a random-access memory (RAM, Random Access Memory), a magnetic disk or optical disk.

Those skilled in the art can understand that all or part of the steps in the foregoing method embodiments can be implemented by a program instructing relevant hardware. The aforementioned program can be stored in a computer readable storage medium. When the program is executed, it executes the steps including the foregoing method embodiments; and the foregoing storage medium includes various media that can store program codes, such as a ROM, a RAM, a magnetic disk, or an optical disk.

Finally, it should be noted that the above embodiments are only used to illustrate the technical solutions of the present disclosure, not to limit them. Although the present disclosure has been described in detail with reference to the foregoing embodiments, those skilled in the art should understand that they can still modify the technical solutions described in the foregoing embodiments, or equivalently replace some or all of the technical features. These modifications or replacements do not cause the essence of the corresponding technical solutions to deviate from the scope of the technical solutions of the embodiments of the present disclosure.

What is claimed is:

1. A gaze point calculation method, comprising:
   determining a 3D model of a first scene;
   obtaining a first panoramic image captured in the first scene, wherein a face image of a face is a part of the first panoramic image;
   determining a spatial location of the face according to the first panoramic image;
   determining a gaze direction corresponding to the face according to the first panoramic image; and
   determining an eye gaze target according to the 3D model, the spatial location and the gaze direction,
   wherein the determining the spatial location of the face according to the first panoramic image comprises:
      determining angular coordinates of the face relative to a first photographing device, wherein the first photographing device is a device that captures the first panoramic image;
      determining a radial distance of the face relative to the first photographing device; and
      determining the spatial location according to the angular coordinates and the radial distance;
   wherein the determining the eye gaze target according to the 3D model, the spatial location and the gaze direction comprises:
      determining an eye gaze area in the 3D model according to the 3D model, the spatial location and the gaze direction; and
      determining the eye gaze target according to the eye gaze area;
   wherein the determining the eye gaze target according to the eye gaze area comprises:
      determining distribution densities corresponding to each sub-area of the eye gaze area, wherein the distribution densities are used to indicate distribution densities of gaze points in the eye gaze area; and
      determining the eye gaze target according to the distribution densities and objects included in the 3D model.

2. The method according to claim 1, wherein the determining the angular coordinates of the face relative to the first photographing device comprises:
   determining face detection areas in the first panoramic image;
   obtaining first perspective images corresponding to each face detection area;
   performing a face detection on the first perspective images, to determine a first coordinate of a face image in each first perspective image, wherein the first coordinate is a coordinate of the face image in a corresponding first perspective image; and
   determining angular coordinates of a face corresponding to a face image in each first perspective image relative to the first photographing device according to the first coordinate of the face image in each first perspective image.

3. The method according to claim 1, wherein the determining the eye gaze area in the 3D model according to the 3D model, the spatial location and the gaze direction comprises:
   determining an eye gaze model according to the gaze direction and the spatial location; and
   determining an eye gaze area in the 3D model according to the 3D model and the eye gaze model.

4. The method according to claim 1, wherein the determining the 3D model of the first scene comprises:
   determining areas for reconstructing a scene in a second scene image;
   obtaining a second perspective image corresponding to each area for reconstructing the scene;

performing a single-image 3D reconstruction on the second perspective images, to obtain depth maps of the second perspective images; and determining the 3D model according to the depth maps of the second perspective images.

5. A non-transitory readable storage medium, comprising a program or an instruction, when the program or instruction is run on a computer, the gaze point calculation method according to claim 1 is executed.

6. A data processing apparatus, comprising a processor, wherein the processor is coupled with a memory;

the memory is configured to store a computer program; and the processor, when executing the computer program stored in the memory, is configured to:

determine a 3D model of a first scene;

obtain a first panoramic image captured in the first scene, wherein the first panoramic image comprises a face image of a face;

determine a spatial location of the face according to the first panoramic image;

determine a gaze direction corresponding to the face according to the first panoramic image; and determine an eye gaze target according to the 3D model, the spatial location and the gaze direction, wherein when the determine the spatial location of the face according to the first panoramic image is performed, the processor is further configured to:

determine angular coordinates of the face relative to a first photographing device, wherein the first photographing device is a device that captures the first panoramic image;

determine a radial distance of the face relative to the first photographing device; and determine the spatial location according to the angular coordinates and the radial distance;

wherein the determine the eye gaze target according to the 3D model, the spatial location and the gaze direction is performed, the processor is further configured to:

determine an eye gaze area in the 3D model according to the 3D model, the spatial location and the gaze direction; and determine the eye gaze target according to the eye gaze area;

wherein when the determine the eye gaze target according to the eye gaze area is performed, the processor is further configured to:

determine distribution densities corresponding to each sub-area of the eye gaze area, wherein the distribution densities are used to indicate distribution densities of gaze points in the eye gaze area; and determine the eye gaze target according to the distribution densities and objects included in the 3D model.

7. The data processing apparatus according to claim 6, wherein when the determine the angular coordinates of the face relative to the first photographing device is performed, the processor is further configured to:

determine face detection areas in the first panoramic image;

obtain first perspective images corresponding to each face detection area;

perform a face detection on the first perspective images, to determine a first coordinate of a face image in each first perspective image, wherein the first coordinate is a coordinate of the face image in a corresponding first perspective image; and determine angular coordinates of a face corresponding to a face image in each first perspective image relative to the first photographing device according to the first coordinate of the face image in the each first perspective image.

8. The data processing apparatus according to claim 6, wherein when the determine the eye gaze area in the 3D model according to the 3D model, the spatial location and the gaze direction is performed, the processor is further configured to:

determine an eye gaze model according to the gaze direction and the spatial location; and determine an eye gaze area in the 3D model according to the 3D model and the eye gaze model.

9. The data processing apparatus according to claim 6, wherein when the determine the 3D model of the first scene is performed, the processor is further configured to:

determine areas for reconstructing a scene in a second scene image;

obtain a second perspective image corresponding to each area for reconstructing the scene;

perform a single-image 3D reconstruction on the second perspective images, to obtain depth maps of the second perspective images; and determine the 3D model according to the depth maps of the second perspective images.

10. A gaze point calculation method, comprising:

determining a 3D model of a first scene;

obtaining a first panoramic image captured in the first scene, wherein a face image of a face is a part of the first panoramic image;

determining a spatial location of the face according to the first panoramic image;

determining a gaze direction corresponding to the face according to the first panoramic image; and determining an eye gaze target according to the 3D model, the spatial location and the gaze direction, wherein the determining the eye gaze target according to the 3D model, the spatial location and the gaze direction comprises:

determining an eye gaze area in the 3D model according to the 3D model, the spatial location and the gaze direction; and determining the eye gaze target according to the eye gaze area, wherein the determining the eye gaze target according to the eye gaze area comprises:

determining distribution densities corresponding to each sub-area of the eye gaze area, wherein the distribution densities are used to indicate distribution densities of gaze points in the eye gaze area; and determining the eye gaze target according to the distribution densities and objects included in the 3D model.

\* \* \* \* \*